United States Patent
Kölblin et al.

(10) Patent No.: US 6,216,172 B1
(45) Date of Patent: Apr. 10, 2001

(54) AUTOMATIC CAN ADDRESS ALLOCATION METHOD

(75) Inventors: Robert Kölblin, Lörrach; Wolfgang Eiche, Neuenweg, both of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/048,412

(22) Filed: Mar. 26, 1998

(30) Foreign Application Priority Data

Mar. 29, 1997 (DE) .............................. 197 13 240

(51) Int. Cl.⁷ .............................. G06F 15/16; G06F 15/76
(52) U.S. Cl. .......................... 709/253; 709/227; 709/253; 710/4; 710/9; 710/220
(58) Field of Search .................... 709/253, 227, 709/228, 220, 221, 222, 245; 340/825.52; 710/3, 4, 200, 220, 8, 9

(56) References Cited

U.S. PATENT DOCUMENTS

| | | | |
|---|---|---|---|
| 4,847,834 | * 7/1989 | Bryant | 370/85 |
| 4,887,075 | * 12/1989 | Hirasawa . | |
| 5,125,076 | * 6/1992 | Faber et al. . | |
| 5,150,464 | * 9/1992 | Sidhu et al. . | |
| 5,304,992 | * 4/1994 | Harashima | 340/825 |
| 5,371,858 | * 12/1994 | Miller et al. . | |
| 5,374,926 | * 12/1994 | Szczepanek | 340/825.52 |
| 5,388,213 | * 2/1995 | Oppenheimer et al. . | |
| 5,502,818 | * 3/1996 | Lamberg | 395/200.16 |
| 5,579,016 | * 11/1996 | Wolcott et al. . | |
| 5,668,952 | * 9/1997 | Slane | 709/245 |
| 5,675,830 | * 10/1997 | Satula . | |
| 5,708,831 | * 1/1998 | Schon | 395/800 |
| 5,729,755 | * 3/1998 | Turski . | |
| 5,835,725 | * 11/1998 | Chiang et al. | 709/228 |
| 5,845,094 | * 12/1998 | Beauchamp et al. . | |
| 5,854,454 | * 12/1999 | Upender et al. . | |
| 5,860,157 | * 1/1999 | Cobb . | |

FOREIGN PATENT DOCUMENTS 40 12 544   10/1991 (DE) .

* cited by examiner

Primary Examiner—Mark H. Rinehart
Assistant Examiner—Stephan Willett
(74) Attorney, Agent, or Firm—Bose McKinney & Evans LLP

(57) ABSTRACT

For automatic CAN address allocation each bus subscriber still to be allocated an address, generates a random value for a provisional address on system power up. On receiving a request to commence address allocation each bus subscriber writes a telegram claiming the provisional address into the CAN send buffer. If a bus subscriber receives a telegram claiming an address which agrees with its own provisional address, a new random value is generated for a provisional address and a telegram claiming this provisional address is written into the CAN send buffer. If the telegram claiming the provisional address is sent before a telegram claiming the same provisional address is received, the provisional address is deposited in the writeable non-volatile memory as the final address.

21 Claims, 1 Drawing Sheet

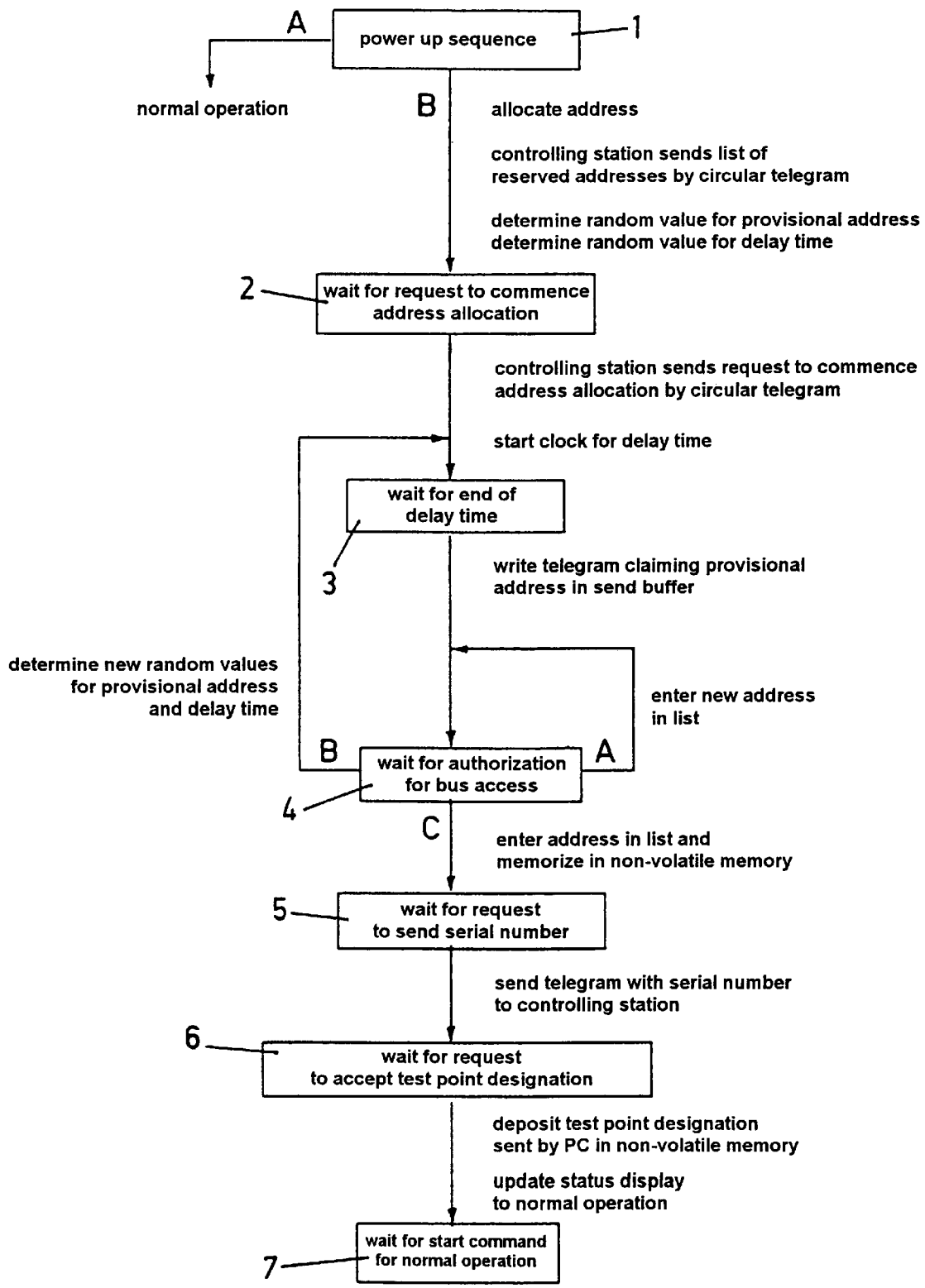

AUTOMATIC CAN ADDRESS ALLOCATION METHOD

FIELD OF THE INVENTION

The invention relates to a method of automatically allocating addresses in a controller area network (CAN) including a plurality of bus subscribers, one of which serves as the controlling station for initiating address allocation, whereby each bus subscriber is assigned a unique serial number memorized in a non-volatile memory of the bus subscriber and whereby each bus subscriber has a writeable non-volatile memory.

BACKGROUND OF THE INVENTION

A controller area network (CAN) is a computer network serving measurement and control instrumentation intercommunication in technical fields, more particularly in motor vehicles and in measurement and control technology. The CAN bus is a two-wire bus. Whilst motor vehicles usually always contain the same measurement and control instrumentation, the addresses of which are dedicated, in measurement and control technology the number of bus subscribers allocated addresses in each case varies and is initially unknown.

Hitherto CAN bus subscriber addresses were set by means of hardware switches by the user, this harboring the risk of the same address being allocated multiply due to a wrong setting. In addition to this the setting needs to be made before other configurations can be implemented which causes additional trouble to the user. Furthermore, address allocation is an activity, the use of which is not immediately apparent to the user since it is lastly of no concern to him how the individual bus subscribers swap information.

Described in EP 0 221 303 B1 is a method of automatically allocating addresses in a computer network. However, this known method requires a bus having more than two wires as well as the existence of a host processor, it thus not being suitable for a CAN environment, i.e. in a network in which only one two-wire bus is available and all bus subscribers have substantially the same priority.

OBJECT OF THE INVENTION

The object of the invention is to define a method which permits automatic address allocation in a CAN environment.

SUMMARY OF THE INVENTION

In accordance with the invention this object is achieved by the following steps in the method:
  each bus subscriber still to be allocated an address, generates a first random value for a provisional address on system power up;
  on receiving a request to commence address allocation sent by the controlling station a telegram claiming the provisional address dictated by the first random value is written into the CAN send buffer of each bus subscriber and a wait initiated for authorization to access the bus in sending the telegram;
  if a bus subscriber receives a telegram claiming an address which fails to agree with its own provisional address. This address is entered into a list of accredited bus subscribers held in a memory of the receiving bus subscriber;
  if before sending its own telegram a bus subscriber receives a telegram claiming an address which agrees with its own provisional address, a new first random value is generated for a provisional address and a telegram claiming this provisional address is written into the CAN send buffer;
  if the telegram claiming its own provisional address is sent before a telegram of some other bus subscriber claiming the same provisional address is received, its own provisional address is accepted as the final address in the list of accredited bus subscribers and deposited in the writeable non-volatile memory.

In the method in accordance with the invention generating and allocating the addresses is done by the individual bus subscribers themselves; the controlling station substantially merely dictating initiation of address allocation. The method is thus particularly suitable for a bus system having essentially equal priority subscribers, and a two-wire bus is sufficient for application of the method.

In one advantageous aspect of the method in accordance with the invention each bus subscriber generates together with the first random value a second random value for a delay time and the telegram claiming the provisional address dictated by the first random value is written into the CAN send buffer on time-out of the delay time dictated by the second random value. The staggered time in claiming random generated provisional addresses caused by the random generated delay time reduces the probability of two or more bus subscribers receiving the same address.

Further advantageous aspects of the method in accordance with the invention are characterized in the sub-claims.

Further features and advantages of the invention will now be described on the basis of an example embodiment with reference to the sole drawing illustrating a flow chart.

The prerequisites for the method in accordance with the invention for automatic address allocation are as follows:
  each CAN bus subscriber has been allocated in the plant a unique serial number which is held in a non-volatile memory, this serial number being readably applied to the rating plate;
  each CAN bus subscriber contains a writeable non-volatile memory for memorizing its own address established in automatic address allocation and the allocated test point designation;
  each CAN bus subscriber has a memory for memorizing a list of accredited addresses of the remaining bus subscribers, whereby this memory may be a volatile memory;
  each CAN bus subscriber has a CAN send buffer and a CAN receive buffer;
  automatic address allocation is initiated by a CAN bus subscriber prepared therefor, termed "controlling station" in the following, during address allocation the controlling station being connected to a PC via which the user is able to enter the test point designation after address allocation;
  the controlling station contains a writeable non-volatile memory for memorizing the established updated configuration, more particularly the addresses and serial numbers of all bus subscribers;
  on every power up the bus subscribers are not able to send telegrams until requested by the controlling station; when additional bus subscribers are accepted in on-line operation a bus subscriber is able to inform the controlling station of its presence and to request permission for address allocation should no enable signal be received within a specific time. Presence telegrams and enable telegrams are circular telegrams, i.e. circulated to be received by all bus subscribers without address allocation;

the CAN bus is continually monitored by all bus subscribers for circular telegrams and telegrams of other bus subscribers.

DESCRIPTION OF THE PREFERRED EMBODIMENT

The flow chart illustrates the sequence in address allocation for first-time power up as "seen" by a bus subscriber which is not the controlling station and is participating in address allocation. The sequence in the steps of the method is as follows:

1: On power up a status entry in the non-volatile memory of the bus subscriber indicates whether the bus subscriber has already been assigned an address (case A) or whether an address needs to be allocated (case B), whereby the bus subscriber may be in the plant or having achieved this status on a specific reset or following an earlier address allocation. In case A the bus subscriber assumes normal operation and does not participate in address allocation.

In case B the controlling station first sends by circular telegram a list of the addresses already reserved. On first-time power up of the CAN network the list contains only the address of the controlling station as well as the addresses for subscribers having a fixed function and not needing to participate in address allocation. In later extensions the list contains the addresses of bus subscribers already present prior to the extension and were prepared for CAN communication.

In the bus subscriber a first random value for a provisional address and a second random value for a delay time is generated with the aid of a random number generator; the starting value for the random generator can be dictated in both cases by the serial number.

2: After the list of reserved addresses has been sent out the controlling station sends a circular telegram requesting commencement of address allocation. The bus subscriber starts the clock for the delay time established by means of the random generator.

3: On time-out of the delay each bus subscriber subscribing to the address allocation writes a telegram claiming its provisional address into its CAN send buffer and waits for authorization for bus access to send the telegram.

4: Once authorization for bus access has been granted, the following situations may materialize:

A: The bus subscriber receives a telegram in which an address is claimed other than its own address. This address is entered by the bus subscriber into its list of accredited bus subscribers.

B: The bus subscriber receives a telegram in which an address is claimed the same as its own address. This may happen when the random generator has generated the same address for two or more bus subscribers. In this case new random values for a provisional address and a delay time need to be generated by the random generator. The generated provisional address is compared to the addresses contained in the list. If the generated provisional address is already contained in the list the procedure is repeated until an address is found which is not yet listed, the clock for the delay time then being restarted.

C; The telegram claiming its own provisional address was sent before some other bus subscriber could claim the same address. In this case the bus subscriber is able to "see" its success by having received a send confirmation before receiving a confirmation of receipt via a telegram of some other bus subscriber claiming the same address. Thus, if the bus subscriber was successful, it enters the claimed address into the list of accredited bus subscribers and it memorizes it in its non-volatile memory so that the address procedure does not need to be re-implemented every time on a further power up.

Not taken into account in the flow chart is the situation in which it cannot be reliably excluded that two or more bus subscribers allocate themselves the same address. This case is highly improbable since it can only happen when the same random delay time has been dictated for these bus subscribers and when the bus subscribers also respond otherwise the same so that they commence sending the same telegram at precisely the same time. In this case of sending at precisely the same time there is no collision of dominant and recessive telegram fields, and each bus subscriber detects successful sending of its own telegram before detecting reception of the same telegrams of other bus subscribers. This constellation is, however, "seen" and corrected in the course of the further steps in the method.

5: Like all bus subscribers the controlling station too, lists the addresses of accredited bus subscribers. On completion of address allocation this list is used as the basis for the controlling station requesting each bus subscriber in sequence to reveal its serial number. Completion of address allocation, i.e. when every bus subscriber has a unique address is "seen" by the controlling station as a bus break making up a multiple of the delay time maximally permitted. Should the aforementioned special case of multiple allocation of same addresses exist, this is detected by two or more stations simultaneously attempting to send their serial numbers. This is "seen" by the controlling station which in turn requests all bus subscribers having the same address to a new address allocation. In this arrangement the list of the reserved addresses contains all other addresses already having been properly allocated.

6: Once all bus subscribers have revealed their serial numbers allocation of the test point designations is done with the aid of these serial numbers. For this purpose the request is made via the connected PC of the user to allocate test point designations to the detected serial numbers. In multi-channel instruments the number of test point designations corresponding to the number of channels belongs to the serial number. The allocated test point designations are likewise memorized by the bus subscribers in the non-volatile memory, each bus subscriber then updating the status entry in its non-volatile memory so that normal operation can be resumed on the next power up.

7; When all bus subscribers have memorized their addresses and test point designations in their non-volatile memories and the updated configuration has also been deposited in the non-volatile memory of the controlling station, the controlling station sends the start command for normal operation so that all subcribers translate into normal operation in synchronism. This may serve the purpose of avoiding bus subscribers attempting to send at the same time, by time slices being defined on the basis of commencement of normal operation in which individual bus subscribers are to send.

What is claimed is:

1. A method of automatically allocating addresses in a controller area network (CAN) including a plurality of bus subscribers, one of which serves as the controlling station for initiating address allocation, whereby each bus subscriber is assigned a unique serial number memorized in a non-volatile memory of the bus subscriber and each bus subscriber has a writeable non-volatile memory, said method comprising the steps of:

on system power up, each bus subscriber still to be allocated an address generates a first random value for a provisional address;

on receiving a request to commence address allocation sent by the controlling station a telegram claiming the provisional address dictated by the first random value is written into the CAN send buffer of each bus subscriber and a wait is initiated for authorization to access the bus in sending the telegram;

if a bus subscriber receives a telegram claiming an address which fails to agree with its own provisional address, this address is entered into a list of accredited bus subscribers held in a memory of the receiving bus subscriber;

if before sending its own telegram a bus subscriber receives a telegram claiming an address which agrees with its own provisional address, a new first random value is generated for a provisional address and a telegram claiming this provisional address is written into the CAN send buffer;

if the telegram claiming its own provisional address is sent before a telegram of some other bus subscriber claiming the same provisional address is received, its own provisional address is accepted as the final address in the list of accredited bus subscribers and deposited in the writeable non-volatile memory, wherein on completion of address allocation said controlling station requests all bus subscribers in sequence on the basis of their allocated addresses to send their serial numbers.

2. The method as set forth in claim 1, wherein each bus subscriber generates together with said first random value, a second random value for a delay time, and said telegram claiming said provisional address dictated by said first random value is written into said CAN send buffer on time-out of said delay time dictated by said second random value.

3. The method as set forth in claim 1, wherein each random value is generated by means of a random generator and the starting value for said random generator is derived from said serial number.

4. The method as set forth in claim 1, wherein on power up said controlling station sends a list of reserved addresses.

5. The method as set forth in claim 1, wherein following generation of a random value for a provisional address, this provisional address is compared to said addresses memorized in said list of accredited bus subscribers and, should agreement exist, the generation of said random value is repeated until no agreement is detected with a memorized address.

6. The method as set forth in claim 1, wherein said controlling station requests bus subscribers having attempted to send their serial numbers at the same time to repeat address allocation.

7. The method as set forth in claim 1, wherein, after all bus subscribers have sent their serial numbers, said controlling station requests the user via a computer connected to said controlling station to allocate each bus subscriber a test point designation, or in the case of a multi-channel instrument, for each channel and in that said bus subscribers enter said test point designations allocated to them into their non-volatile memories.

8. The method as set forth in claim 2, wherein each random value is generated by means of a random generator and the starting value for said random generator is derived from said serial number.

9. The method as set forth in claim 2, wherein on power up said controlling station sends a list of reserved addresses.

10. The method as set forth in claim 3, wherein on power up said controlling station sends a list of reserved addresses.

11. The method as set forth in claim 2, wherein following generation of a random value for a provisional address, this provisional address is compared to said addresses memorized in said list of accredited bus subscribers and, should agreement exist, the generation of said random value is repeated until no agreement is detected with a memorized address.

12. The method as set forth in claim 3, wherein following generation of a random value for a provisional address, this provisional address is compared to said addresses memorized in said list of accredited bus subscribers and, should agreement exist, the generation of said random value is repeated until no agreement is detected with a memorized address.

13. The method as set forth in claim 2, wherein said controlling station requests bus subscribers having attempted to send their serial numbers at the same time to repeat address allocation.

14. The method as set forth in claim 2, wherein after all bus subscribers have sent their serial numbers, said controlling station requests the user via a computer connected to said controlling station to allocate each bus subscriber a test point designation, or in the case of a multi-channel instrument, for each channel and in that said bus subscribers enter said test point designations allocated to them into their non-volatile memories.

15. The method as set forth in claim 3, wherein said controlling station requests bus subscribers having attempted to send their serial numbers at the same time to repeat address allocation.

16. The method as set forth in claim 15, wherein after all bus subscribers have sent their serial numbers, said controlling station requests the user via a computer connected to said controlling station to allocate each bus subscriber a test point designation, or in the case of a multichannel instrument, for each channel and in that said bus subscribers enter said test point designations allocated to them into their non-volatile memories.

17. The method as set forth in claim 4, wherein said controlling station requests bus subscribers having attempted to send their serial numbers at the same time to repeat address allocation.

18. The method as set forth in claim 17, wherein after all bus subscribers have sent their serial numbers, said controlling station requests the user via a computer connected to said controlling station to allocate each bus subscriber a test point designation, or in the case of a multi-channel instrument, for each channel and in that said bus subscribers enter said test point designations allocated to them into their non-volatile memories.

19. The method as set forth in claim 5, wherein said controlling station requests bus subscribers having attempted to send their serial numbers at the same time to repeat address allocation.

20. The method as set forth in claim 19, wherein, after all bus subscribers have sent their serial numbers, said controlling station requests the user via a computer connected to said controlling station to allocate each bus subscriber a test point designation, or in the case of a multi-channel instrument, for each channel and in that said bus subscribers enter said test point designations allocated to them into their non-volatile memories.

21. The method as set forth in claim 6, wherein, after all bus subscribers have sent their serial numbers, said controlling station requests the user via a computer connected to said controlling station to allocate each bus subscriber a test point designation, or in the case of a multi-channel instrument, for each channel and in that said bus subscribers enter said test point designations allocated to them into their non-volatile memories.

\* \* \* \* \*